(No Model.) 2 Sheets—Sheet 1.

J. WINTER.
MACHINE FOR SPLITTING GRAINS.

No. 500,729. Patented July 4, 1893.

WITNESSES:

INVENTOR
J. Winter
BY
ATTORNEYS.

(No Model.)

J. WINTER.
MACHINE FOR SPLITTING GRAINS.

No. 500,729.  Patented July 4, 1893.

WITNESSES:
Marion Hall
Charles Bles

INVENTOR
J. Winter
BY
ATTORNEYS.

United States Patent Office.

JOSEF WINTER, OF ASCHERLEBENS, GERMANY.

MACHINE FOR SPLITTING GRAINS.

SPECIFICATION forming part of Letters Patent No. 500,729, dated July 4, 1893.

Application filed July 29, 1891. Serial No. 401,056. (No model.)

*To all whom it may concern:*

Be it known that I, JOSEF WINTER, a subject of the King of Prussia, and a resident of Ascherlebens, Germany, have invented a new and Improved Machine for Splitting Grains, of which the following is a specification.

In manufacturing cracked or split grains, the hulled barley, oats or other grains are cut transversely into pieces, and it is very essential to cut the grains so that solid pieces are obtained and as little powdered material as possible.

The object of my invention is to provide a machine that will cut the grains one or more times transversely without producing any powdered material at the same time.

The invention consists in the combination with a rotating disk having radial grooves in its upper surface, of a ring surrounding said disk, the inner edge of said ring being a short distance from the outer edge of the disk, and inclined blades held in said ring and extending to the rim of the disk.

The invention also consists in the combination and construction of parts and details which will be fully described hereinafter and finally pointed out in the claim.

Figure 1:
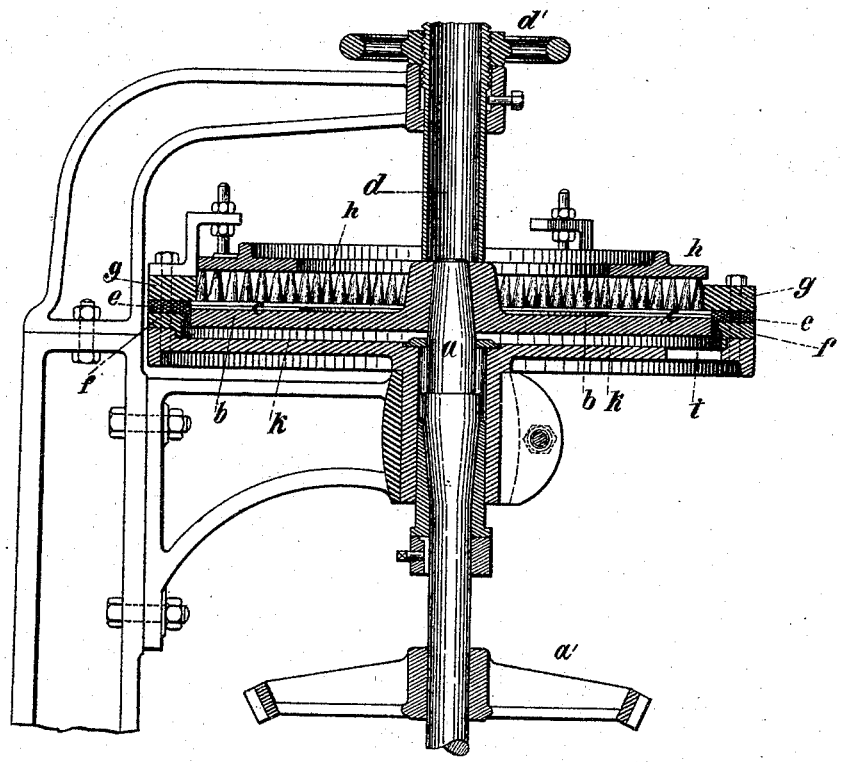
Figure 2:
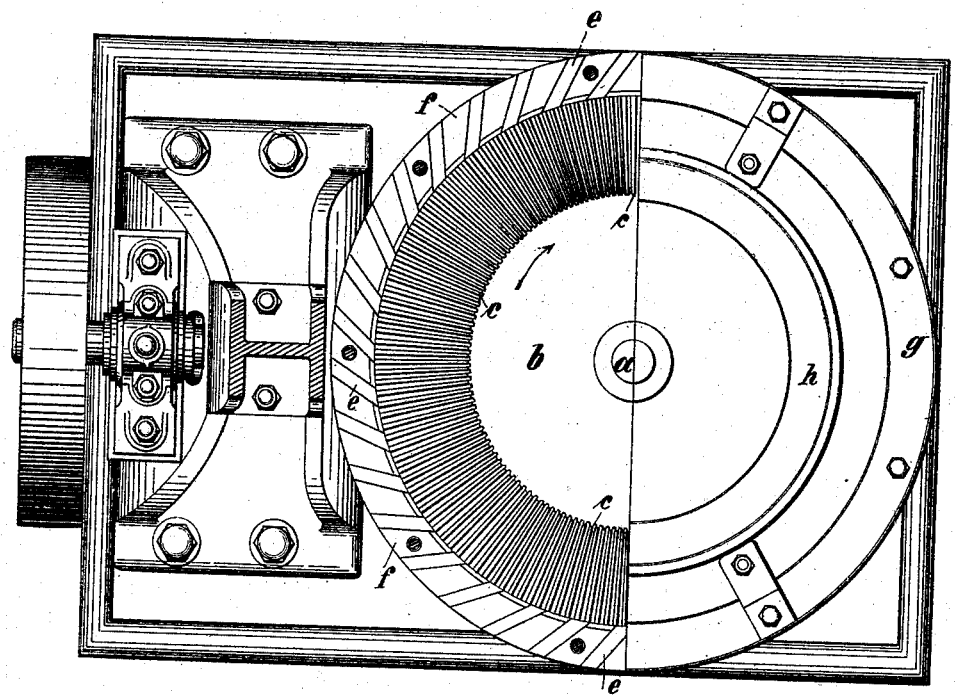
Figure 3:
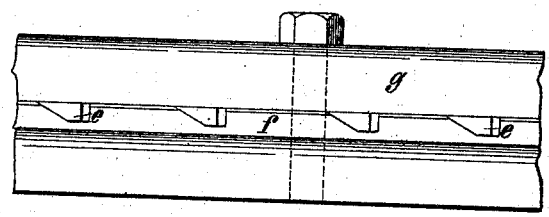

In the accompanying drawings, Figure 1 is a vertical transverse sectional view of my improved machine for cutting grains. Fig. 2 is a horizontal sectional view of the same, parts being shown in plan-view, and Fig. 3 is a detail side elevation from the inner side of the fixed ring, showing the shape of the blades.

Similar letters of reference indicate corresponding parts.

On the vertical shaft $a$, which is adapted to be rotated by means of beveled gearing, the disk $b$ is fixed, which is provided at its upper surface with a series of radial grooves or channels $c$. The hulled grains that are to be cut or split are fed into the tube $d$, which can be raised or lowered more or less by means of the nut $d'$, and pass through the lower end of said tube $d$ upon the upper surface of the disk $b$, which is rotated at a speed of about two hundred turns per minute. The centrifugal force throws the grains into the grooves $c$ and forces them toward the ends of said grooves. The transverse sections of the grooves are such that the grains will fit in the same only when the length of the grain is parallel with the length of the groove.

A short distance from the edge of the disk $b$, a fixed ring $f$ is provided, and the grains can project from the edges of disk $b$ to the inner edge of said ring $f$. In said ring $f$ a series of inclined blades $e$ are arranged, which are held in place by the plate $g$ bolted down on the same. To prevent the grains from being thrown out of the grooves $c$, a ring-shaped vertically-adjustable brush $h$ is arranged above the disk $b$, thus compelling the grains to travel in the grooves toward the rim of the disk $b$. As the blades extend to the rim of the disk, the projecting parts of the grains are cut off clear and sharp by the shearing action of said blades, without producing any powdered material. The split or cut grains drop through an opening $i$ in the plate $k$ below the rotating disk $b$.

Having thus described my invention, I claim as new and desire to secure by Letters Patent—

In a machine for splitting grains, the combination with a vertical shaft, of a disk fixed thereon, which disk is provided in its upper surface with a radial groove, a fixed ring surrounding the rotating disk and located a short distance from the rim of the same and a series of inclined blades held in said ring and projecting beyond the inner edge of the same to the rim of the rotating disk, the bottom edges of the blades being beveled to insure a sharp cut, substantially as set forth.

In witness whereof I have hereunto set my hand in presence of two witnesses.

JOSEF WINTER.

Witnesses:
    WILHELM BINDEWALD,
    PAUL FISCHER.